US010290299B2

(12) United States Patent
Hwang et al.

(10) Patent No.: US 10,290,299 B2
(45) Date of Patent: May 14, 2019

(54) SPEECH RECOGNITION USING A FOREIGN WORD GRAMMAR

(71) Applicant: Microsoft Technology Licensing, LLC, Redmond, WA (US)

(72) Inventors: Mei-Yuh Hwang, Redmond, WA (US); Hua Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/408,773

(22) PCT Filed: Jul. 17, 2014

(86) PCT No.: PCT/CN2014/082375
§ 371 (c)(1),
(2) Date: Dec. 17, 2014

(87) PCT Pub. No.: WO2016/008128
PCT Pub. Date: Jan. 21, 2016

(65) Prior Publication Data
US 2016/0267902 A1    Sep. 15, 2016

(51) Int. Cl.
*G10L 15/00*    (2013.01)
*G10L 15/18*    (2013.01)
*G06F 17/27*    (2006.01)

(52) U.S. Cl.
CPC .......... *G10L 15/005* (2013.01); *G06F 17/274* (2013.01); *G10L 15/18* (2013.01)

(58) Field of Classification Search
None
See application file for complete search history.

(56) References Cited

U.S. PATENT DOCUMENTS 5,027,406 A    6/1991    Roberts et al.
5,987,410 A    11/1999    Kellner et al.
(Continued)

FOREIGN PATENT DOCUMENTS

CN    1107915 C    5/2003
CN    101218625 A    7/2008
(Continued)

OTHER PUBLICATIONS

"DictationGrammar Class", Published on: Nov. 4, 2011 Available at: http://msdn.microsoft.com/en-us/library/system.speech.recognition.dictationgrammar(v=vs.110).aspx, 6 pgs.
(Continued)

*Primary Examiner* — Richa Mishra

(57) ABSTRACT

Systems and methods are utilized for recognizing speech that is partially in a foreign language. The systems and methods receive speech input from a user and detect if a rule or sentence entry grammar structure utilizing a foreign word has been uttered. To recognize the foreign word, a foreign word grammar is utilized. The foreign word grammar includes rules for recognizing the uttered foreign word. Two rules may be included in the foreign word grammar for each legitimate or slang term included in the foreign word grammar. A first rule corresponds to the spoken form of the foreign word, and the second rule corresponds to the spelling form of the foreign word. The foreign word grammar may also utilize a prefix tree. Upon recognizing the foreign word, the recognized foreign word may be sent to an application to retrieve the pronunciation, translation, or definition of the foreign word.

18 Claims, 16 Drawing Sheets

(56) References Cited

U.S. PATENT DOCUMENTS

| | | | |
|---|---|---|---|
| 5,995,923 A | 11/1999 | Nguyen et al. | |
| 6,845,388 B1* | 1/2005 | Philyaw | G06F 17/30876 707/E17.112 |
| 7,206,742 B2 | 4/2007 | Schmid et al. | |
| 9,342,233 B1* | 5/2016 | Dimson | G06F 3/0488 |
| 2001/0014859 A1 | 8/2001 | Itoh et al. | |
| 2004/0210444 A1 | 10/2004 | Arenberg et al. | |
| 2007/0016420 A1 | 1/2007 | Azulai et al. | |
| 2010/0211376 A1* | 8/2010 | Chen | G10L 15/187 704/2 |
| 2012/0310626 A1* | 12/2012 | Kida | G06F 17/273 704/8 |
| 2012/0323967 A1 | 12/2012 | Ju et al. | |
| 2013/0132069 A1* | 5/2013 | Wouters | G06F 17/28 704/8 |
| 2015/0255069 A1* | 9/2015 | Adams | G10L 15/187 704/236 |
| 2015/0371628 A1* | 12/2015 | Kreifeldt | G10L 15/02 704/254 |

FOREIGN PATENT DOCUMENTS

| | | |
|---|---|---|
| CN | 101329868 B | 6/2011 |
| CN | 103309926 A | 9/2013 |
| JP | 2005099376 A | 4/2005 |

OTHER PUBLICATIONS

"Chinese English Dictionary Free on the App Store on iTunes", Published on: May 24, 2013 Available at: https://itunes.apple.com/us/app/chinese-english-dictionary/id475211454?rnt=8 4 pgs.

PCT International Preliminary Report on Patentability in PCT/CN2014/082375, dated Jan. 26, 2017, 7 pages.

"First Office Action and Search Report Issued in Chinese Patent Application No. 201480049453.1", dated Oct. 22, 2018, 15 Pages.

\* cited by examiner

SPEECH RECOGNITION USING A FOREIGN WORD GRAMMAR

This application is a National Stage Application of PCT/CN2014/082375, filed 17 Jul. 2014, which application is incorporated herein by reference. To the extent appropriate, a claim of priority is made to the above disclosed application.

BACKGROUND

Foreign languages are often difficult to understand for anyone who is not fluent in the language. For example, English is considered a difficult language to learn, but English is often considered a valuable language to understand. In China, for instance, English learning is a goal for many people because it may render better opportunities and jobs. As such, English-Chinese bilingual dictionaries are increasingly popular. These dictionaries may be either paper or electronic, and users may look up a word by typing in the word or looking it up in a dictionary sorted by common alphabetical order. Instead of typing in the word or looking it up in a paper dictionary, it would be useful to have a dictionary that could receive speech input. One difficulty with speech input in these situations, however, is that users generally do not know how to pronounce the word, making speech recognition of more challenging.

It is with respect to these and other general considerations that embodiments have been made. Also, although relatively specific problems have been discussed, it should be understood that the embodiments should not be limited to solving the specific problems identified in the background.

SUMMARY

The technology relates to systems and method for speech recognition utilizing a foreign word grammar. Systems and methods are utilized for recognizing speech that is partially in a foreign language. For example, upon the user uttering a particular sentence that includes a foreign word, the sentence is recognized as a sentence entry grammar structure. The sentence entry grammar structures generally include static text in a first language, often the native language of the user, and a placeholder for a foreign word, where the foreign word is in a second language other than the user's native language. To recognize the foreign word uttered by the user in place of the placeholder, a foreign word grammar is utilized. The foreign word grammar includes rules corresponding to legitimate or slang terms in the foreign language. Two rules may be included for each of the foreign words in the foreign word grammar. A first rule corresponds to the spoken form of the foreign word, and a second rule corresponds to the spelling form of the foreign word. As such, the foreign word may be recognized if the user either speaks or spells the foreign word.

The foreign grammar may also utilize probabilities and statistical weights. The probabilities and statistical weights may be based on the frequency that a foreign word is used in the foreign language. The statistical weights and probabilities may also be based on aggregated results from users of the technology. For example, the results of the recognized foreign words may be recorded in an aggregated result database, and the statistical weights and probabilities may be adjusted based on the frequency of the words in the aggregated result database.

The foreign word grammar may also utilize a prefix tree to recognize the uttered foreign word. In embodiments, the prefix tree incorporates probabilities into the transition arcs, instead of the nodes of the prefix tree. By incorporating the probabilities into the transition arcs, effective pruning or limiting may be achieved during decoding. The probabilities may be scattered to the transition arc through an analysis of the probabilities of the nodes in the prefix tree.

Upon recognizing the foreign word, the foreign word may be sent to an application. The application may be chosen based on the detected sentence entry grammar structure. For example, where a user asks "What does <word> mean?", the results of the foreign word uttered in place of the placeholder <word>, may be sent to an electronic dictionary application to retrieve the definition of the foreign word. After the application processes the request, the results are returned to the user.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive embodiments are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present disclosure is defined by the appended claims and their equivalents.

The present disclosure generally relates to recognizing foreign words as a part of automatic speech recognition. Recognition of spoken foreign words can often be difficult because the speaker often mispronounces the foreign word because it is in a language in which they are not fluent. As such, the present application provides a method and system that allows the users to spell the foreign word by speaking each of the letters. For example, a user may likely see the foreign word while reading or in some form of media, and thus would know each of the letters enabling them to correctly spell the word.

Recognition of spoken letters, however, is conventionally a difficult task, and speech recognition programs of the past have had very low accuracy rates. With the English language in particular, this low accuracy rate of the past is understandable because even native English speakers have difficulty recognizing the letters of the English alphabet. In particular, the letters all ending with a long "e" sound, such as the set of {B, C, D, E, G, P, T, V}, cause additional problems due to their similar sounds. In the English language, English speakers often have to utilize a "phonetic alphabet" to accurately convey which letter they intended to say. The NATO phonetic alphabet is one example of a phonetic alphabet that equates the letter "A" to "alpha," the letter "B" to "bravo," the letter "C" to Charlie, and so forth. As such, the present application discloses systems and methods for more accurately recognizing spoken foreign words and the spelling forms of the foreign words by utilizing a rule-based grammar, as discussed in more detail below.

Figure 1:
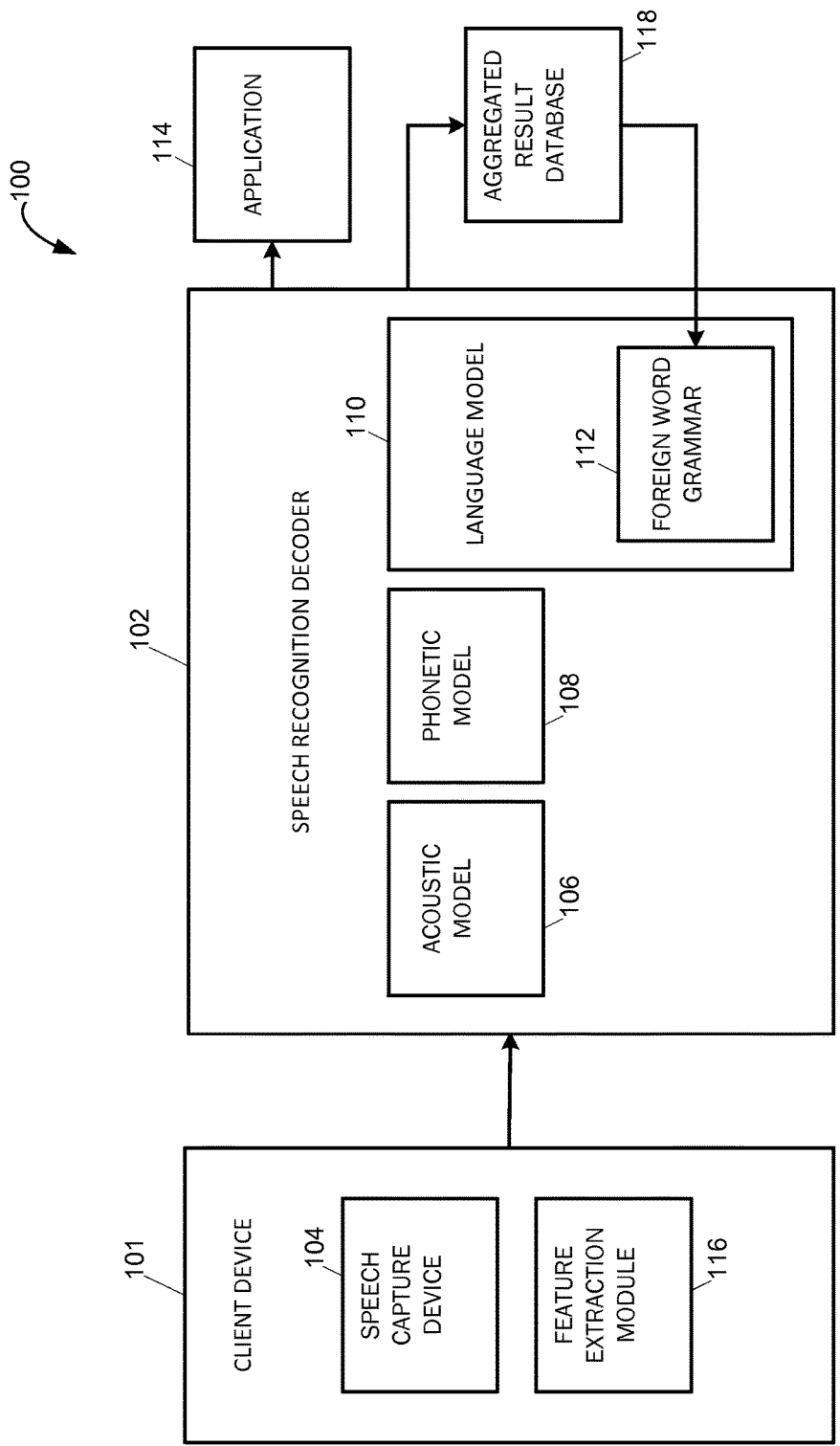
FIG. 1 depicts a system for recognizing speech.

FIG. 1 depicts a system 100 for recognizing spoken foreign words. As depicted in FIG. 1, a client device 101 receives speech input from the user. The speech input may be captured by speech capture device 104. The speech capture device 104 may be a combination of hardware and software components, such as a microphone and digitizing software, among other well-known speech capture devices. In embodiments, feature vectors may also be extracted by the feature extraction module 116, and those feature vectors are sent to a speech recognition decoder 102. The feature vectors may be set of n-dimensional vectors of numerical features representing the speech input. Multiple acceptable methods for extracting feature vectors are known to those having skill in the art, including the Mel-frequency cepstral technique, linear prediction, and perceptual linear prediction, among others. In such embodiments, the feature vectors are extracted from the speech input captured by speech capture device 104.

The speech recognition decoder 102 determines the most likely word or letter sequence that matches the speech input and/or the feature vectors. The determination by the speech recognition decoder 102 is based on an acoustic model 106, a phonetic model 108, and a language model 110. The language model 110 is further based on a foreign word grammar 112, such as a rule-based grammar or a context-free grammar. The acoustic model 106, the phonetic model 108, and the language model 110, all operate to constrain the possible results of the speech recognition. The constraints may be in the form of statistical analysis or probabilities. For instance, the acoustic model 106 and the phonetic model 108 are utilized to generate phonetic likelihoods or probabilities of the captured speech. For spelled letters, the acoustic model 106 and the phonetic model 108 may be utilized to designate a particular probability for each of the spoken letters. One having skill in the art will recognize and understand many suitable methods for determining these phonetic likelihoods.

The phonetic likelihoods determined using the acoustic model 106 and the phonetic model 108 are further constrained by the language model 110. The language model incorporates phrases that indicate that the user is attempting to say or spell a foreign word for which a definition, translation, or definition is desired. Such phrases and rules within the language model are discussed in further detail below in conjunction with the description of FIG. 3. The phrase indicating that the user is attempting to say or spell a foreign word, causes the foreign word grammar 112 to be utilized to further constrain the phonetic probabilities to a particular word. The foreign word grammar 112 includes a set of rules based on the legitimate spellings and pronunciations of words in the foreign language. As such, by utilizing the foreign word grammar 112, the phonetic probabilities of the letter strings may be constrained to words that are legitimate words or slang words in the foreign language that are incorporated in the foreign word grammar 112. For example, constraining the probabilities may include eliminating or reducing the probabilities of letter sequences that do not exist in the foreign word grammar 112. By constraining the phonetic probabilities of the letter strings to only the words in the foreign word grammar 112, the results of the speech recognition for the foreign words will be limited only legitimate or slang terms in the foreign language.

The foreign word grammar 112 may also include statistical weights for each of the words. For instance, words that are more likely to occur in the foreign language may be given a higher weight, as discussed in further detail below. These statistical weights may be updated based on aggregated user input. For instance, as many users utilize the system, certain foreign words will be requested more than other foreign words. Statistics based on aggregated request information may be utilized to determine and adjust the statistical weights assigned to each word in the foreign word grammar 112. In embodiments, to accomplish the adjustment, the results of the foreign word decoding are received by an aggregated result database 118. Based on the frequency of the terms in the aggregated result database 118, the statistical weights may be determined. For example, where a first word appears more frequently than a second word in the database, the first word may be given a higher weight. The determined statistical weights may then be used to adjust the statistical weights used by the foreign word grammar 112.

The resultant recognized word or letter sequence determined by the speech recognition model 102 may then be received by an application 114. The application 114 may be an application such as an electronic dictionary or translator, among other similar applications. One example of a suitable electronic dictionary is the BING DICTIONARY electronic dictionary available from the Microsoft Corporation of Redmond, Wash. The application 114 may also be part of an intelligent personal assistant such as the CORTANA intelligent personal assistant from the Microsoft Corporation of Redmond, Wash.

The functionalities of the above system may be performed on a single device or across multiple devices, such as a client and server. For example, when using multiple devices, the speech capture device 104 may be on the client device 101, and the feature extraction module 116 may also be executed by the client device 101. In such an example, the speech recognition decoder 102 may operate on a server or other network or cloud-based component. The application 114 may also reside in either the client or server. By having the speech recognition decoder 102 operate on a server, more resources may be used in the decoding and recognition process. In other examples, all functionality except for capturing speech input may be accomplished by the server or other network or cloud-based component. Alternatively, all features may be performed by one device, such as the client device 101. One having skill in the art will also recognize other architectures for automatic speech recognition suitable for use with the methods and systems disclosed herein.

Figure 2A:
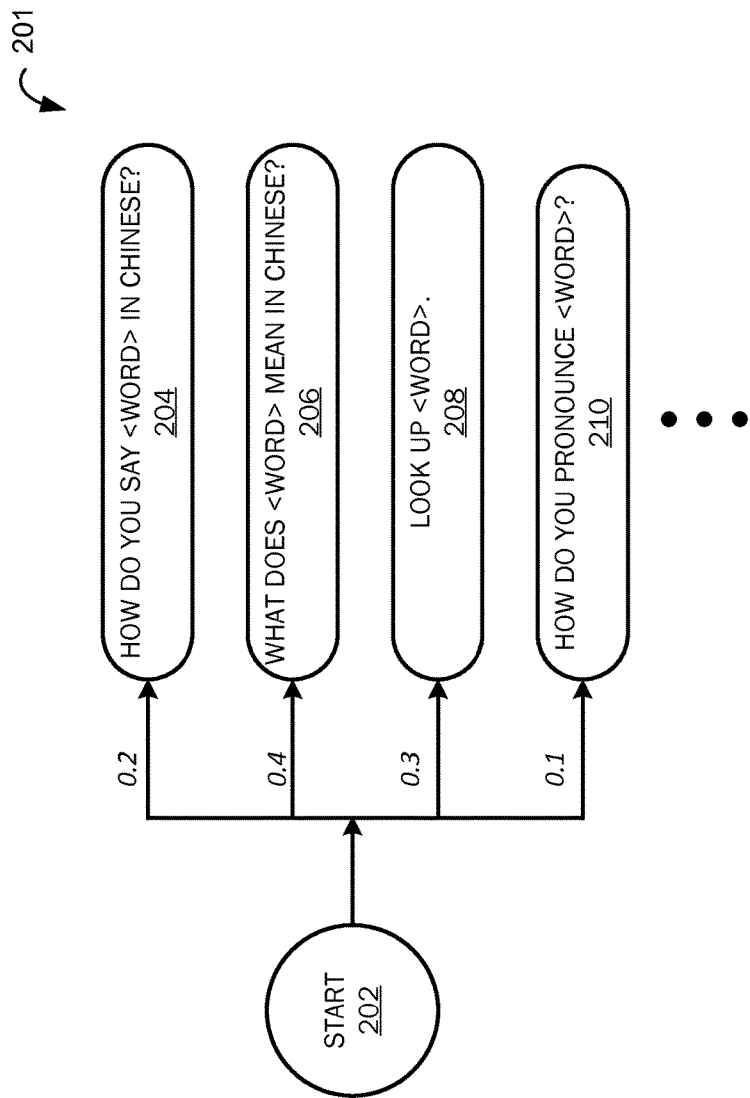
FIG. 2A depicts a set of sentence entry grammar structures or rules for use with the foreign word grammar.

FIG. 2A depicts a set 201 of sentence entry grammar structures or rules for use with the foreign word grammar 112. The rules 204, 206, 208 and 210 depicted in FIG. 2A illustrate that foreign word grammar 112 is utilized to recognize at least one uttered foreign word or uttered spelling of the foreign word. For instance, the placeholder <word> represents either the spoken form of the foreign word or the spelling form of the spoken word. As one example, from a starting node 202, the speech recognition decoder 102 analyzes the processed speech input to determine if the word sequences making up the sentence entries depicted in FIG. 2A have been uttered. For instance, when the speech recognition decoder 102 determines the word string "How do you say <word> in Chinese?" in rule 204 has been uttered, the foreign word grammar 112 is utilized to determine the placeholder <word>. The speech recognition of the placeholder <word> is based on the foreign word grammar 112, which is discussed in further detail below in conjunction with the description of FIGS. 3 and 4. Other rules may define additional phrases or grammar structures including the placeholder <word> that trigger the use of the foreign word grammar 112 to decode the foreign word uttered in place of the placeholder <word>. For example, the word string "What does <word> mean in Chinese?" as depicted in rule 206, the word string "Look up <word>." as depicted in rule 208, and the word string "How do you pronounce <word>?" as depicted in rule 210, are all potential word strings that trigger the use of the foreign word grammar 112 to decode the word or spelling uttered in place of the placeholder <word>. Many other rules conveying the same intent to look up, define, translate, or pronounce a foreign word may also be utilized.

While written in English in this document, it will be appreciated by those skilled in the art that the non-placeholder words, referred to herein as the static text of the grammar structure or rule, in the word string of the grammar structure are in one language, likely the user's native language, and the word uttered in place of the placeholder, <word>, is in a second or foreign language. For instance, in rule 204 the static text forming the words "How do you say" and "in Chinese" would all be in the Chinese language, and the word uttered in place of the placeholder, <word>, would be in another language, such as English. As an example, for a native Chinese speaker the sentence entry grammar structure may be "<word> 中文什么意思" [translated: What does <word> mean in Chinese?], where the word or spelling of the word uttered in place of the placeholder <word> would be in a language other than Chinese, such as English or Spanish. As another example, for a native Spanish speaker the sentence entry grammar structure may be "Como se dice <word> en espaliol?," [translated: "How do you say <word> in Spanish?"] where the word or spelling of the word uttered in place of the placeholder <word> would be in a language other than Spanish, such as English. In embodiments, the particular foreign language of the placeholder <word> will be explicitly stated in the grammar structure. One example of such a grammar structure is "What does the English word <word> mean in Chinese?". In additional embodiments, the language of the placeholder <word> may be inferred from the context of the sentence entry grammar structure, prior usage by the user, settings on the user's device, or other potential indicators. In some embodiments, multiple foreign word grammars may be used for each foreign language likely to be used. One example set of rules for use with a native Chinese speaker is included below in Table 1.

TABLE 1

| Rules | English Translation of Rules |
|---|---|
| <word> | <word> |
| 中文<word>的意思 | What's meaning of <word> in Chinese? |
| <word>怎么应用 | How to use <word> |
| 搜索<word>的中文 | Search for the Chinese meaning for <word> |
| 查找<word>的中文 | Look for the Chinese meaning for <word> |
| 查找<word> | Look for <word> |
| 用<word>造句儿 | Give me a sentence using <word> |
| 拼写<word> | Spell <word> |
| 查字典<word> | Look into dictionary for <word> |
| 查单词<word> | Look for the word <word> |
| 查询<word> | Query for <word> |
| <word>是什么意思 | What's meaning of <word>? |
| <word>的意思 | The meaning of <word> |
| <word>怎么用 | How to use <word> |
| 搜索<word> | Search for <word> |
| <word>拼写正确吗 | Is <word> spelled correct? |
| <word>同义词 | Synonyms of <word> |
| 用<word>造句 | Make a sentence using <word> |
| <word>是动词吗 | Is <word> a verb? |
| <word>的副词形式 | Adverb of <word> |
| <word>是动词吗 | Is <word> a noun? |
| <word>的翻译 | Translation of <word> |
| 翻译<word> | Translate <word> |
| <word>是怎么翻译 | How to translate <word> |
| <word>怎么翻译 | How to translate <word> |
| <word>意思 | <word>'s meaning |
| 意思<word> | Meaning of <word> |
| <word>的意思 | <word>'s meaning |
| <word>什么意思 | What's meaning of <word> |
| 什么意思<word> | What's meaning of <word> |
| <word>是什么意思 | What's meaning of <word> |
| <word>中文意思 | What's meaning of <word> in Chinese? |
| 中文意思<word> | What's meaning of <word> in Chinese? |
| <word>的中文意思 | What's meaning of <word> in Chinese? |
| <word>中文什么意思 | What's meaning of <word> in Chinese? |
| 中文什么意思<word> | What's meaning of <word> in Chinese? |
| <word>中文是什么意思 | What's meaning of <word> in Chinese? |
| <word>的中文是什么意思 | What's meaning of <word> in Chinese? |
| <word>翻译中文 | Translate <word> to Chinese. |
| 翻译中文<word> | Translate <word> to Chinese. |
| 中文翻译<word> | Translate <word> to Chinese. |
| <word>中文翻译 | Translate <word> to Chinese. |
| <word>翻译成中文 | Translate <word> to Chinese. |
| 翻译成中文<word> | Translate <word> to Chinese. |
| 中文如何翻译<word> | How to translate <word> in Chinese. |
| <word>中文如何翻译 | How to translate <word> in Chinese. |
| <word>中文是怎么翻译 | How to translate <word> in Chinese. |
| 中文是怎么翻译<word> | How to translate <word> in Chinese. |
| <word>中文 | <word> in Chinese. |
| 中文<word> | <word> in Chinese. |
| <word>的中文 | <word> in Chinese. |
| <word>的中文翻译 | <word> in Chinese translation. |
| <word>中文怎么翻译 | How to translate <word> in Chinese. |
| 中文怎么翻译<word> | How to translate <word> in Chinese. |
| <word>的中文怎么翻译 | How to translate <word> in Chinese. |
| <word>怎么用中文翻译 | How to translate <word> in Chinese. |
| 怎么用中文翻译<word> | How to translate <word> in Chinese. |
| <word>中文翻译是什么 | How to translate <word> in Chinese. |
| <word>的中文翻译是什么 | How to translate <word> in Chinese. |

Statistical weights may also be associated with each of the sentence entry grammar structures. For example, the sentence entry grammar structure 204 may have a statistical weight of 0.2, as indicated by the number 0.2 illustrated between start node 202 and sentence entry grammar structure 204. Other statistical weights may also be associated with the sentence entry grammar utilized with the foreign word grammar. As such, each sentence entry grammar structure may be weighted by a score representing that the sentence pattern is likely to be spoken by a user.

Figure 2B:
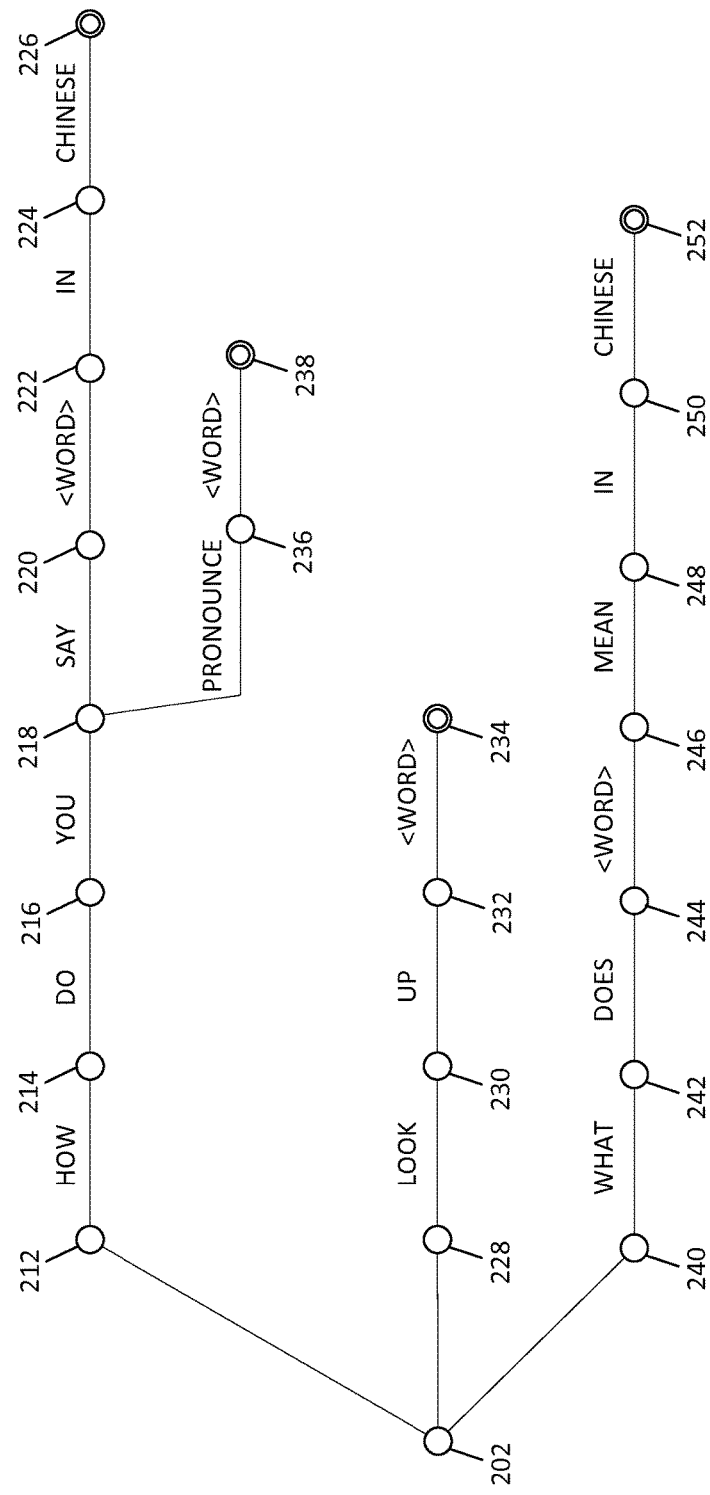
FIG. 2B depicts an example embodiment of a potential grammar structure corresponding to some of the rules depicted in FIG. 2A.

FIG. 2B illustrates an example embodiment of a potential grammar structure corresponding to rule 204 and 206 shown in FIG. 2A. During the speech recognition process, the speech recognition decoder 102 traverses the grammar structures to determine whether the incoming speech signal corresponds to any of the particular grammar structures 202, 204, 206 or 210 (FIG. 2A).

As depicted, the grammar structure corresponding to rule 204 begins at node 212. The rule 204 grammar structure has a transition from starting node 212 to node 214 that is associated with the static word "how." From node 214 to node 216, the structure has a second word transition associated with the static word "do." Similar word transitions occur for the transitions between node 216 and node 218 associated with the word "you" and between node 218 and 220 associated with the static word "say." From node 220 to node 222, the grammar structure corresponding to rule 204 has a placeholder transition, or grammar structure transition, as indicated by the placeholder <word>. Upon detecting the grammar structure transition as indicated by the placeholder <word>, the speech recognition decoder 102 utilizes the grammar structure for the placeholder <word> to determine the word or letters uttered by the user in place of the place of the placeholder <word>. For instance, speech recognition decoder 102 replaces the transition between node 220 and node 222 with the rule-based foreign word grammar discussed below in conjunction with the description of FIGS. 3 and 4, which represents the <word> grammar structure. The speech recognition decoder then determines if the captured speech signal can be represented by part of the grammar structure corresponding to rule 204 including the transition provided by the <word> grammar structure.

Following the placeholder transition between node 220 and node 222 is a word transition between node 222 and node 224 associated with the static word "in." A final word transition associated with the static word "Chinese" occurs between node 224 and terminal node 226. Upon the terminal node, an application may be determined for which to send the result of the recognized foreign word in place of the placeholder <word> may be sent. Such an application may be application 114, and the type of application may be determined based on the particular rule recognized by the speech recognition decoder 102. In the example rule 204, the application may be an electronic dictionary or translator capable of providing a pronunciation of the foreign word.

As shown in FIG. 2B, there may also be a separate transition from node 218 to node 236 associated with the static word "pronounce" may occur between node 218 and 236 if the user has said the word "pronounce" rather than the word "say." A placeholder transition then occurs between node 236 and terminal node 238. Upon recognizing the phrase preceding terminal node 238, corresponding to rule 210, an application suitable for pronouncing recognized foreign word may be determined based on the phrase preceding terminal node 238.

Another grammar structure starting at node 228 is associated with rule 208. From node 228 to node 230, the structure has a transition associated with the static word "look." From the node 230 to node 232 the structure has a transition associated with the static word "up." The final transition in the structure between node 232 and terminal node 234 is a placeholder transition as indicated by the placeholder <word>. Based on the phrase preceding the terminal node 234, an application for looking up a word may be determined.

Yet another example of a sentence entry grammar structure corresponding to rule 206 is shown in FIG. 2B beginning at node 240. The node 240 to node 242, the structure has a transition associated with the static word "what." Another static word transition associated with the word "does" occurs between node 242 and node 244. A placeholder transition occurs between node 244 and 246. Following the placeholder transition, three static transitions occur between the node 246, the node 248, the node 250, and the terminal node 252 associated with the words "mean," "in," and "Chinese," respectively. As will be understood, similar grammar structures may be utilized for the additional rules depicted in FIG. 2A and other similar rules utilized in a rule-based grammar.

Figure 3:
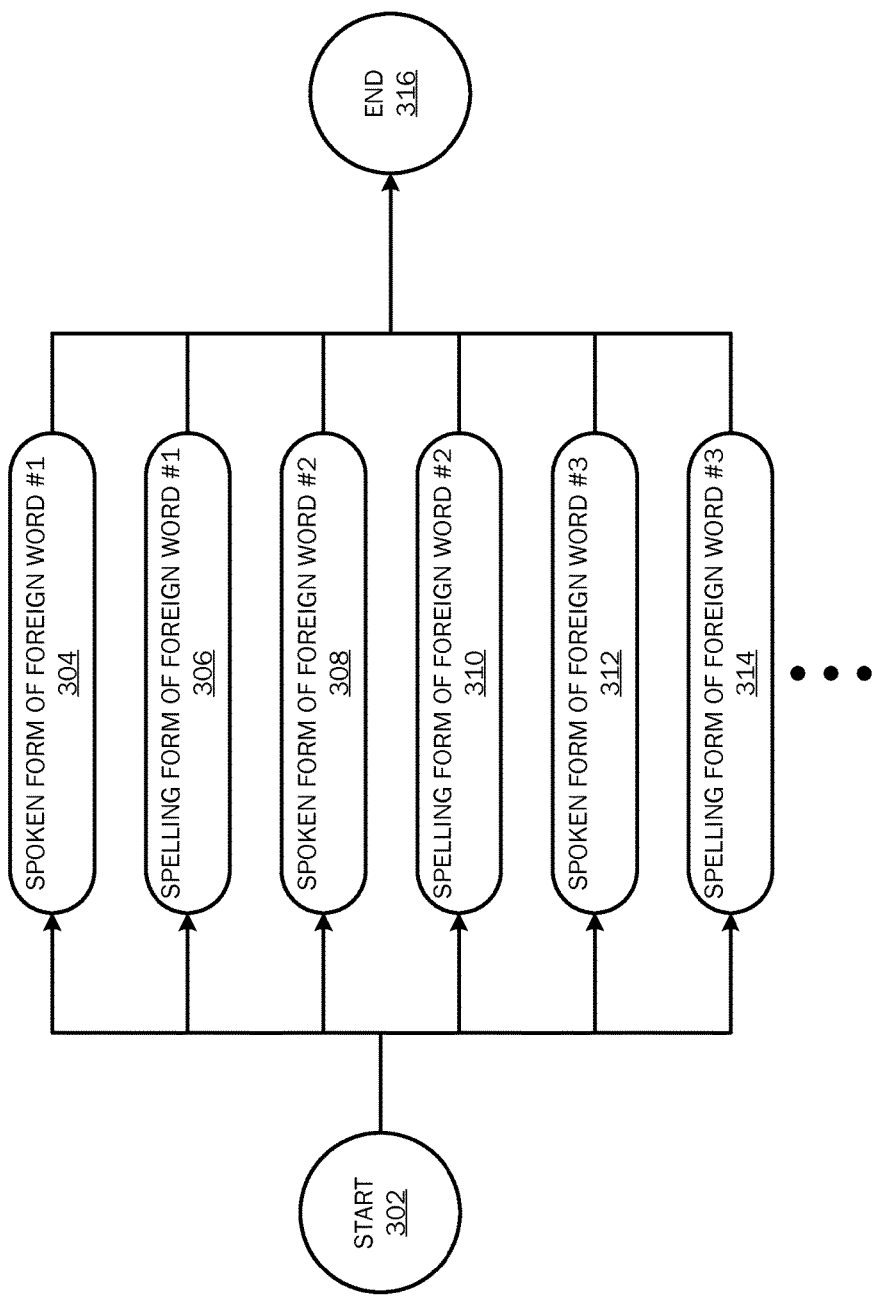
FIG. 3 depicts a set of rules in the foreign word grammar for recognizing foreign words.

FIG. 3 depicts a set of rules in the foreign word grammar 112 for recognizing foreign words. The set of rules in the foreign word grammar 112 includes two rules for each foreign word. A first rule associated with a foreign word may be the full pronunciation or spoken form of the foreign word. The first rule corresponds to the occurrence where the user attempts to speak or pronounce the foreign word. A second rule associated with the foreign word may be the spelling of the foreign word. The second rule corresponds to the occurrence where the user verbally spells the foreign word. As such, there are two parallel paths in the grammar for which any foreign word in the grammar may be recognized.

As depicted in FIG. 3, the rules begin from a starting node 302. Starting node 302 may be triggered upon the detection of a placeholder transition as discussed above in conjunction with the description of FIGS. 2A-B. From starting node 302, two parallel paths exist for each foreign word included in the foreign word grammar 112. For instance, there is a first grammar structure or rule 304 for the spoken form of a foreign word #1 and second grammar structure or rule 306 for the spelling form of foreign word #1. Similar rule pairs exist for the other foreign words in the foreign word grammar 112. For example, there is a first grammar structure or rule 308 for the spoken form of a foreign word #2 and second grammar structure or rule 310 for the spelling form of foreign word #2. There is also a first grammar structure or rule 312 for the spoken form of a foreign word #3 and second grammar structure or rule 314 for the spelling form of foreign word #3. Following the grammar structures or rules for each word is an ending or terminal node 316. At terminal node 316, speech recognition decoder may return to the respective sentence grammar structure as discussed above in conjunction with the description of FIGS. 2A-B, or output the result of the recognized foreign word.

While there are only three foreign words depicted in the foreign word grammar 112, any number of foreign words may be included in the foreign word grammar 112. For example, the most common 50,000 words in the foreign language may be included in the foreign word grammar 112. In such an example, there would be 100,000 rules or grammar structures in the foreign word grammar 112 corresponding to the 50,000 words. Generally, these words would include legitimate words in the foreign language, such as from a dictionary. The words in the foreign word grammar may also include slang terms that are utilized in the foreign language even though the slang term may not appear in an official dictionary. By including only legitimate words and slang terms in the foreign word grammar, the speech recognition results will be constrained to only those legitimate words and slang terms. The use of the foreign word grammar thus provides a higher accuracy than previous n-gram-based models, such as bigrams or trigrams. In some embodiments, however, the results will be constrained to only the terms in the grammar when a certain threshold confidence level is determined for the result. For example, if the confidence level in the accuracy of the result is particularly low, the foreign word grammar 112 may be substituted with a standard to n-gram based method for decoding the input speech, or other similar methods. Such an occurrence may happen where the user speaks or spells a rare word that does not have a corresponding rule included in the foreign word grammar 112. For instance, the English word "mesial" is rarely used amongst English speakers, and may not be included in the foreign word grammar 112. If the speaker said or spelled the word "mesial," an alphabet n-gram may be utilized to recognize the word. The alphabet n-gram may operate in parallel with the foreign word grammar 112.

Additionally, where the speech recognition decoder 112 determines that the probabilities of a first and second foreign word having been spoken are the same or within a particular tolerance, the speech recognition decoder 112 may utilize a set of statistical weights. The statistical weights may be assigned to each word in the foreign word grammar. The weights may be based on multiple variables, including the frequency that the foreign word is used in the foreign language. A word that is used more frequently in a foreign language may be given a higher weight than a word that is used less commonly in the foreign language. For example, the word "during" is used more frequently in the English language than the word "purring," but the spelling or pronunciation sound somewhat similar. These statistical weights may also be updated or adjusted based on aggregated user input. For instance, as many users utilize the system, certain foreign words will be requested by users more than other foreign words. Those aggregated statistics may be utilized to determine or adjust the statistical weights assigned to each word in the foreign word grammar 112.

Figure 4A:
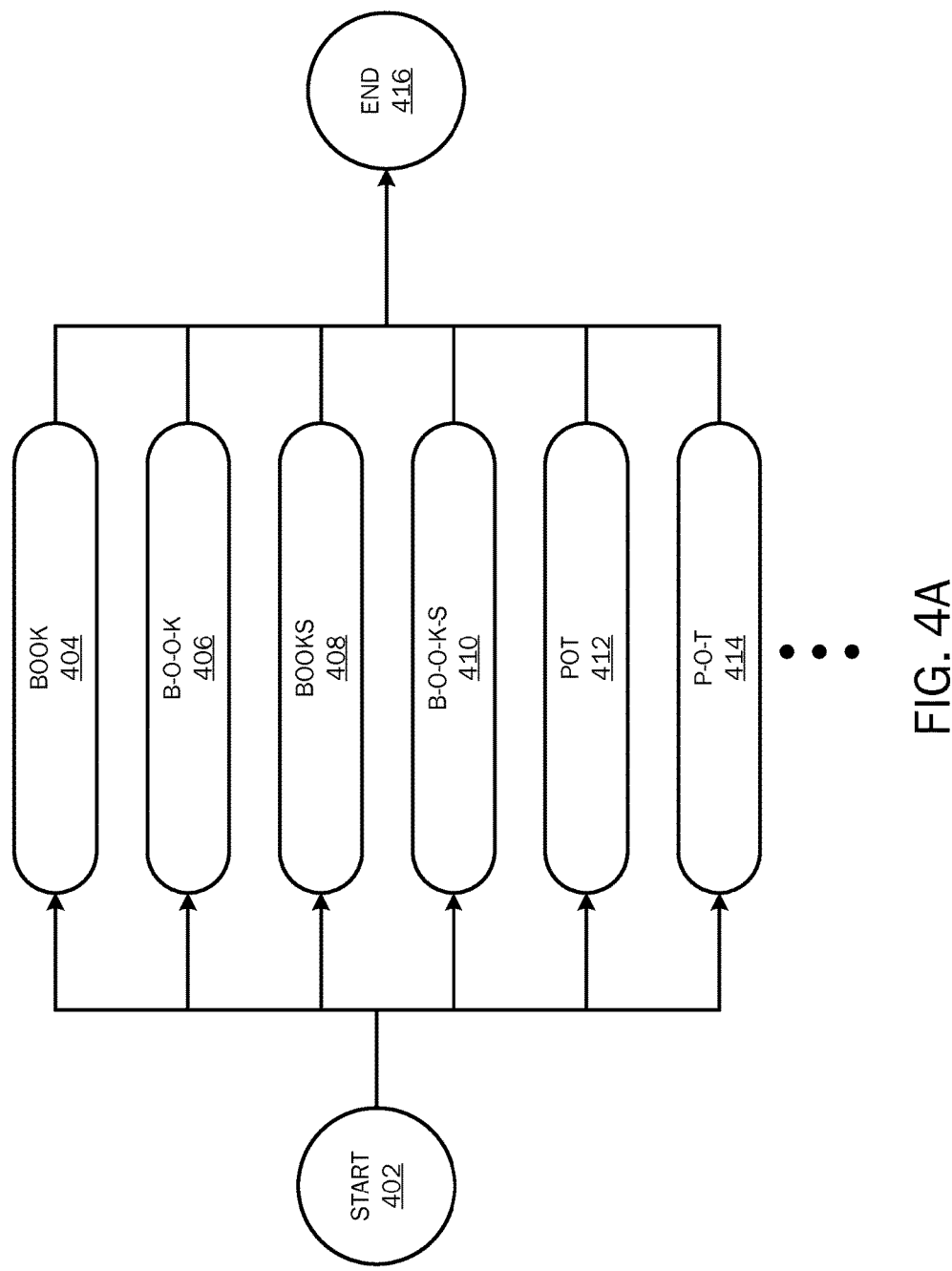
FIG. 4A depicts an example set of the rules in the foreign word grammar.

FIG. 4A depicts an example set of the rules in the foreign word grammar 112. As shown in FIG. 4A, the three hypothetical foreign words discussed above in conjunction with the description of FIG. 3 have been replaced by the illustrative foreign words "book," "books," and "pot." Although the words are depicted in English, English words are foreign words to non-English speakers. For instance, the English words depicted would be recognized in place of a placeholder <word> in sentence entry grammar structure with non-English static text. As such, the example words in FIG. 4A would be in a foreign grammar dictionary of a non-English user, such as a Chinese user.

By way of example, the foreign word #1 from FIG. 3 is equivalent to the word "book" depicted in FIG. 4A. There are two parallel paths for the word "book" to be recognized. Starting from node 402, the first grammar structure or rule 404 for the word book is the spoken form of the word "book." The second grammar structure or rule 406 is the spelling form of the word "book," i.e., "b-o-o-k." Either path may be traversed by the speech recognition decoder 102 to recognize that the uttered speech was intended to be the word "book," depending on whether the user attempted to pronounce the word or spell the word. Other similar rules may exist for other words included in the foreign word grammar 112. As depicted, a rule 408 for the spoken form of the word "books" and a rule 410 for the spelling form of the word "books" may be included in the foreign word grammar 112. Additionally, as an example of a commonly used slang term in English, two grammar structures or rules 412, 414 for the word "pot" may be included in the foreign word grammar 112. For example, the rule 412 corresponds to the spoken form of the word "pot" and rule 414 corresponds to the spelling form of the word "pot." Following each of the rules is an ending or terminal node 416. At terminal node 316, speech recognition decoder may return to the respective sentence grammar structure as discussed above in conjunction with the description of FIGS. 2A-B, or output the result of the recognized foreign word.

As discussed above, statistical weights may be assigned to each of the words. In embodiments, a statistical weight is assigned to the spelling form of the foreign word and another statistical weight is assigned to spoken form of the foreign word.

The following description along with FIGS. 4B-4E illustrate and describe an example usage of statistical weights for the spelling forms of foreign words.

Figure 4B:
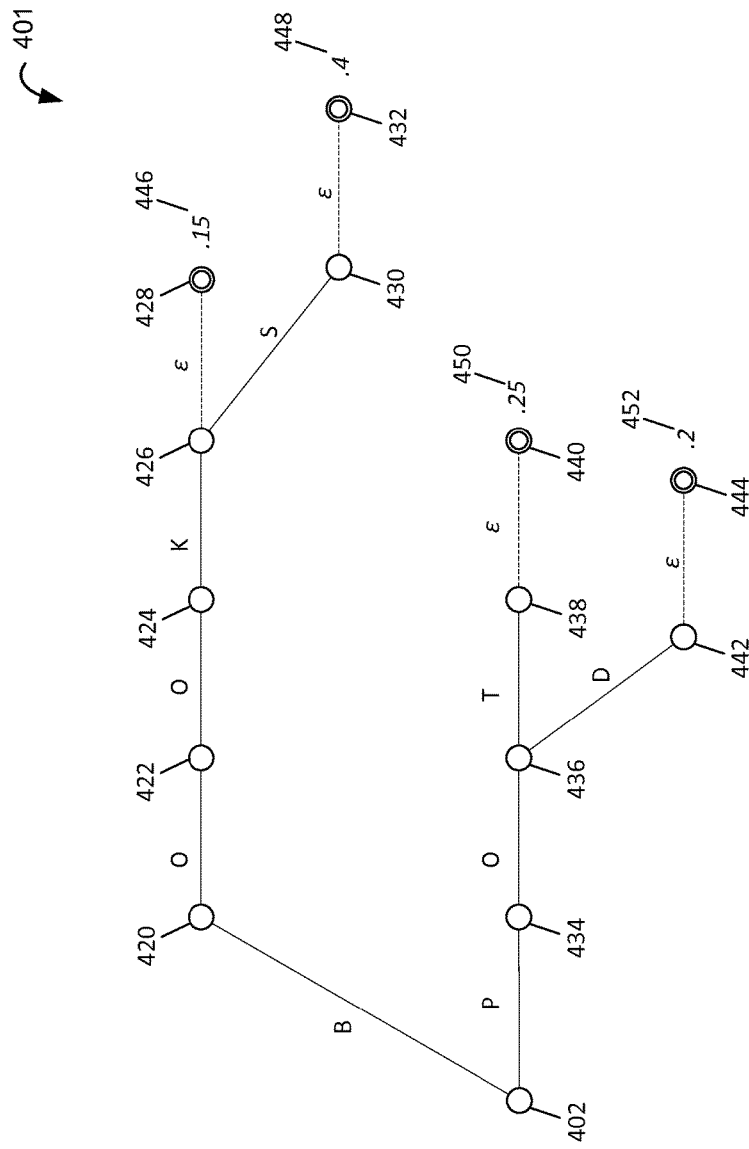
FIGS. 4B-E illustrate an example usage of statistical weights for the spelling forms of foreign words.
Figure 4C:
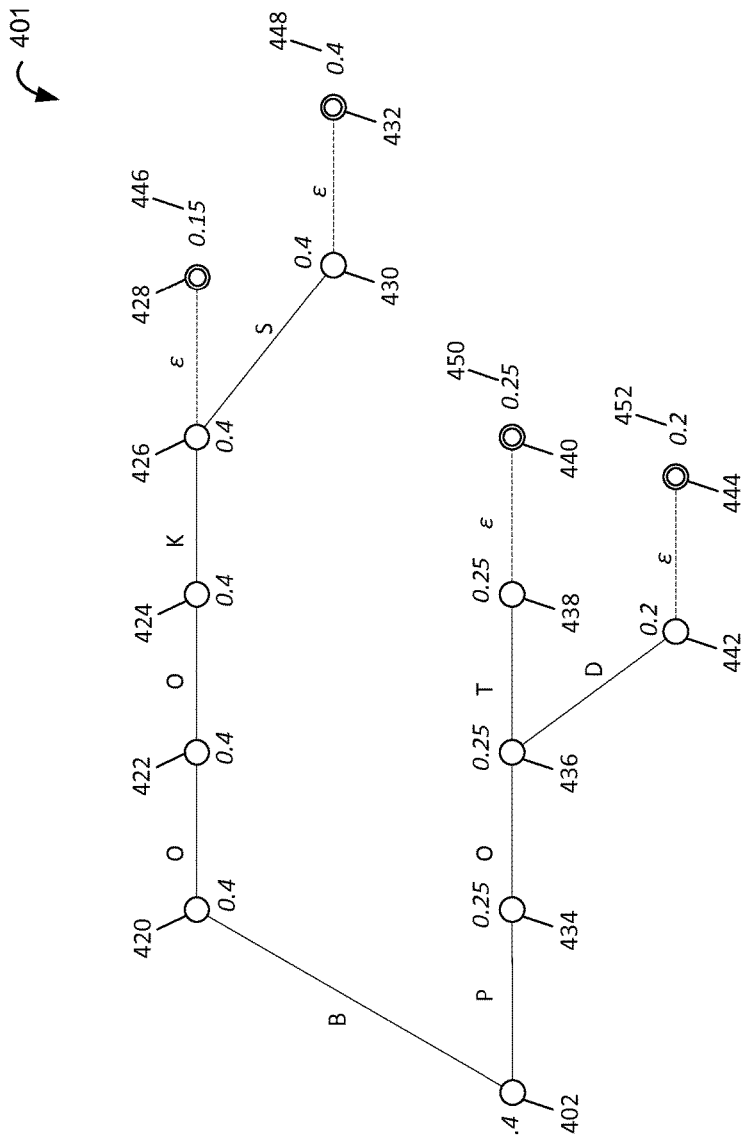

The collection of spelling paths illustrated in FIG. 4A may be further optimized by compiling the spelling forms of all words in the foreign word grammar 112 into a letter-based prefix tree 401, as shown in FIG. 4B. The prefix tree 401 incorporates probabilities into the transition arcs, as discussed in further detail below. By incorporating the probabilities into the transition arcs of the prefix tree 401, effective pruning or limiting may be achieved during decoding. FIG. 4B represents a prefix tree 401 for four words {book, books, pot, and pod} with unigram probabilities {0.15, 0.4, 0.25, 0.2}, respectively.

For more effective decoding, the unigram probabilities may be scattered into the prefix tree 401. One potential algorithm for scattering the unigram probabilities is discussed as follows. Each node in the prefix tree contains two pieces of information: {isleaf, maxprob}. The isleaf value is a Boolean value that is true when the node is a terminal, or leaf, node. The maxprob value is a value indicative of the maximum probability. Each transition arc also contains two pieces of information {letter, prob}. At the outset, a start node, or root node, is created where {isleaf, maxprob}={false, unknown}. For each word in the grammar, the spelling is added to the prefix tree. Each internal non-terminal node initially has an unknown maxprob value. For example, initially each internal node has the following values {isleaf, maxprob}={false, unknown}. A terminal node, or leaf node, is added for each word, and the leaf node has the following initial values {isleaf, maxprob}={true, unigram probability}. The transition arc to the leaf node is an epsilon transition, or empty transition as indicated by the e in FIG. 4B. In some embodiments, the leaf node may also contain a word identifier for the word spelled by the letter sequence indicated by the path from the root node to the leaf node.

For each internal node in the prefix tree 401, the maxprob value is computed. For example, maxprob=max {maxprob of all of its subtrees}. The results of such computations are shown above or below the internal nodes in FIG. 4C. For example, the maxprob value for internal node 436 is equal to 0.25 because the maximum maxprob of any of the subtrees is 0.25. Specifically, the subtree including node 438 has a maxprob of 0.25, whereas the other subtree including node 442 has a maxprob of 0.2. Therefore, the maxprob for node 436 is equal to 0.25. Likewise, the node 426 has a maxprob of 0.4 because its 2 subtrees have maxprob values of 0.4 and 0.15 respectfully. The root node 402 has maxprob of 0.4 because the maximum maxprob for all the subtrees in the prefix tree 401 is 0.4. To determine the maxprob values for the internal nodes, the following algorithm may be used:

```
FindMaxprob(root);
Float FindMaxprob(NODE *node)
{
    If (node==NULL) return 0;
    If (node->isleaf) return node->prob;
    Float maxp=-infinite;
    For each (child c of node)
    {
        Float p = FindMaxprob(c);
        If (p > maxp) maxp = p;
    }
    node->prob = maxp;
    Return maxp;
}
```

Figure 4D:
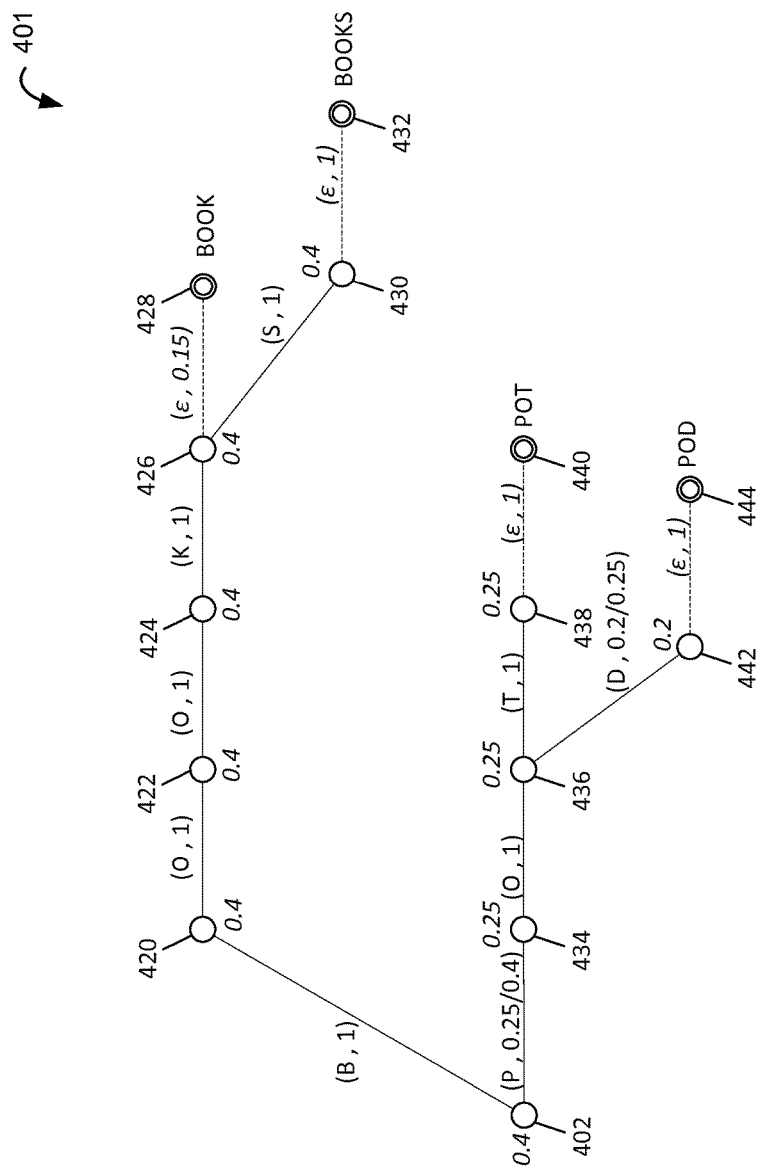

Using the same variables and values as in the above algorithm, the probability for each of the transition arcs is also determined. For each internal transition arc from node to c, the probability is computed such that c.maxprob=root.maxprob$\Pi_{a \text{ is an arc on } Path(root \to c)}$(a.prob). From induction, the probability value for the transition arcs, arc.prob, may be derived by computing c.maxprob/ node→maxprob. Examples of arc.prob value values are shown in FIG. 4D. For example, the transition arc from root node 402 to internal node 434 is equal to 0.25/0.4=0.625. Specifically, for that transition arc from root node 402 to internal node 434, the probability for the transition arc is equal to the maxprob value of the child node 434, i.e., the node closer to leaf node, over the maxprob of the preceeding node. As another example, the transition arc between root node 403 and internal node 420 is equal to 1 because the maxprob value of the child node 420 is the same as the maxprob value of the preceeding node 402.

Figure 4E:
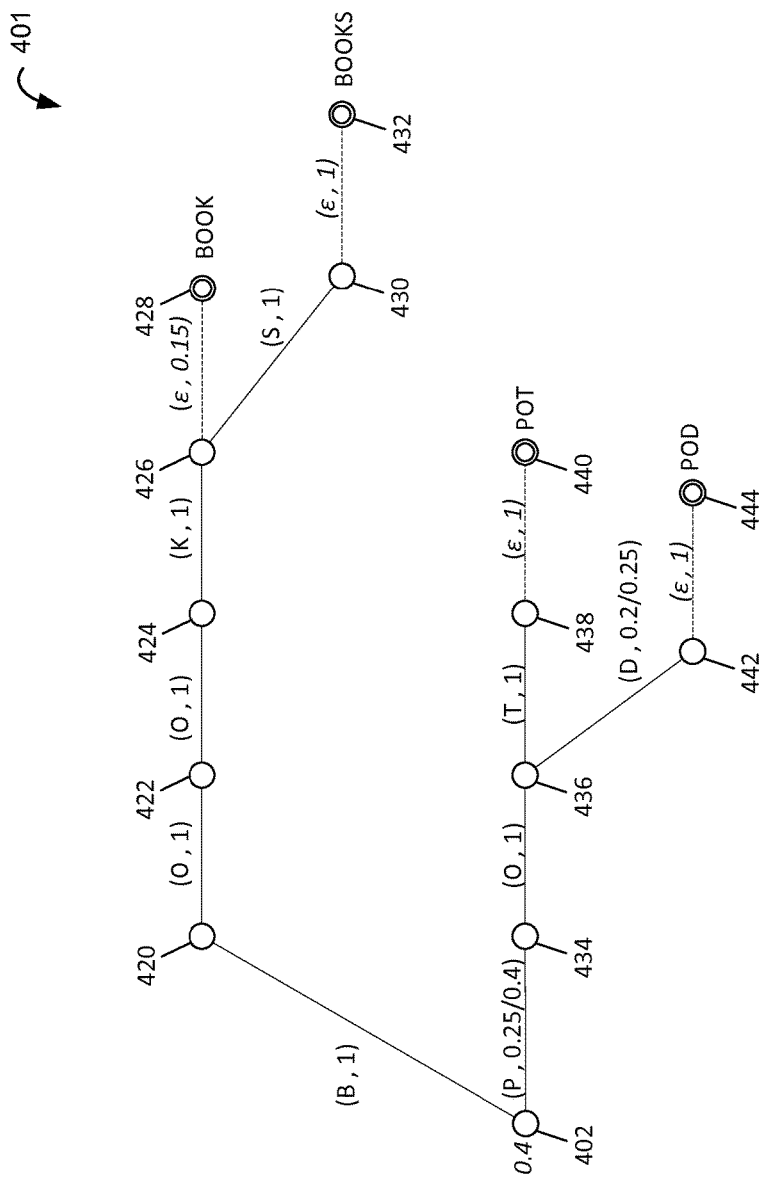

After the probabilities for the transition arcs have been determined, the maxprob values for the internal nodes may no longer be necessary, except for the root node. FIG. 4E illustrates the prefix tree with only the transition arc probabilities represented and the node maxprob values removed. At decoding runtime, when the speech recognition decoder 102 enters an initial state, it applies root.maxprob into the total score of the hypothesis path. As it enters the next node, the transition arc probability is applied, until a leaf is reached, at which point the probability of the entire letter sequence is exactly the probability of the word spelled by the path. By applying the maxprob values at the early stages of the prefix tree, the prefix tree may be pruned of constrained so that only likely paths are left in the search space early on. In additional to powerful pruning capabilities, the prefix tree also saves computation power by eliminating duplicated partial paths, such as prefixes of words.

Figure 5:
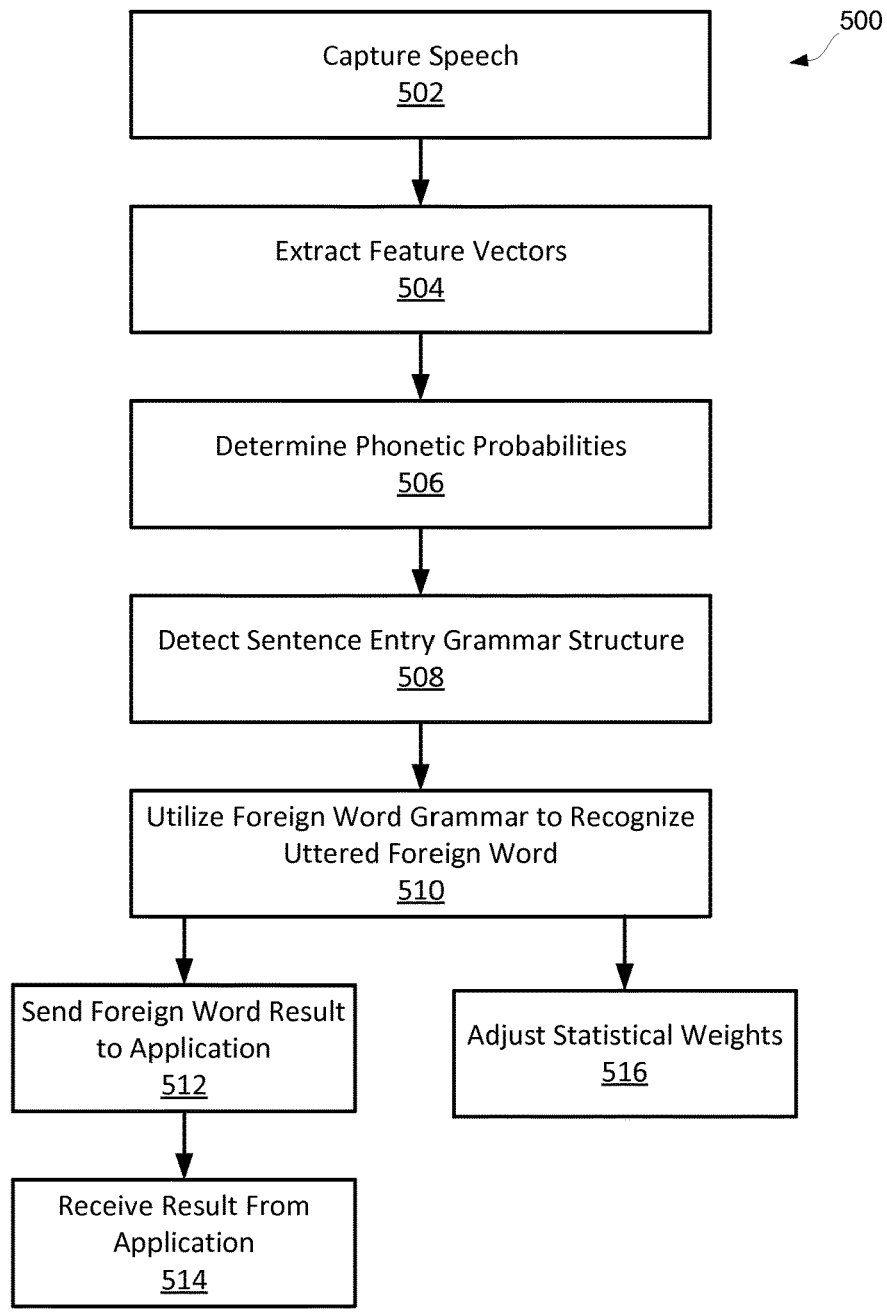
FIG. 5 depicts a method for accurately recognizing a foreign word uttered by a user.

FIG. 5 depicts a method 500 for accurately recognizing a foreign word uttered by a user. While the methodology is shown and described as being a series of acts that are performed in a sequence, it is to be understood and appreciated that the methodology is not limited by the order of the sequence. For example, some acts can occur in a different order than what is described herein, as will be appreciated by those skilled in the art. In addition, some acts can occur concurrently with another act. For example, the adjustment of the statistical weights may occur concurrently with the processing of the recognized word by the application. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

As depicted, at operation 502 speech from a user is captured. The speech may be captured from the speech capture device 104. At operation 504, feature vectors may be extracted from the captured speech. At operation 506, the phonetic probabilities of the captured speech are determined. The phonetic probabilities may be determined by the speech recognition decoder 102 based on the acoustic model 106 and the phonetic model 108. For instance, the acoustic model 106 and the phonetic model 108 may be utilized to generate phonetic likelihoods of the captured speech. For spelled letters, the acoustic model 106 and the phonetic model 108 may be utilized to designate a phonetic probability for each of the spoken letters. One having skill in the art will recognize and understand many suitable methods for determining these phonetic likelihoods.

At operation 508, a sentence entry grammar structure is detected. The sentence entry grammar structure may be detected by the speech recognition decoder 102. The sentence entry grammar structure may include the sentence entry grammar structures discussed above in conjunction with the description of FIGS. 2A-B. In detecting the sentence entry grammar structure, the foreign word grammar 112 is utilized to recognize an uttered foreign word, such as the foreign word uttered in place of the placeholder <word> in the sentence entry grammar structures discussed above, at operation 510. The result from operation 510, i.e., the recognized foreign word, is sent to an application at operation 512. The application referred to in operation 512 may be application 114 discussed above in conjunction with the description of FIG. 1. The application then processes the result based on the sentence entry grammar structure and the recognized foreign word. For example, where the detected sentence entry grammar structure is "Look up <word>," a dictionary application may receive the foreign word uttered in place of the placeholder <word>. Upon receiving recognized foreign word, the dictionary application may process the foreign word and provide a definition in the native language. That resultant definition is then received at operation 514. The appropriate application may be selected by an intelligent personal assistant such as the CORTANA intelligent personal assistant from the Microsoft Corporation of Redmond, Wash. The functionality for selecting the appropriate application based on the sentence entry grammar structure may also be incorporated into the speech recognition decoder 102, or a separate program or application.

At operation 516 the results of the recognized foreign word may be utilized to adjust the statistical weights utilized by the foreign word grammar 112.

Figure 6:
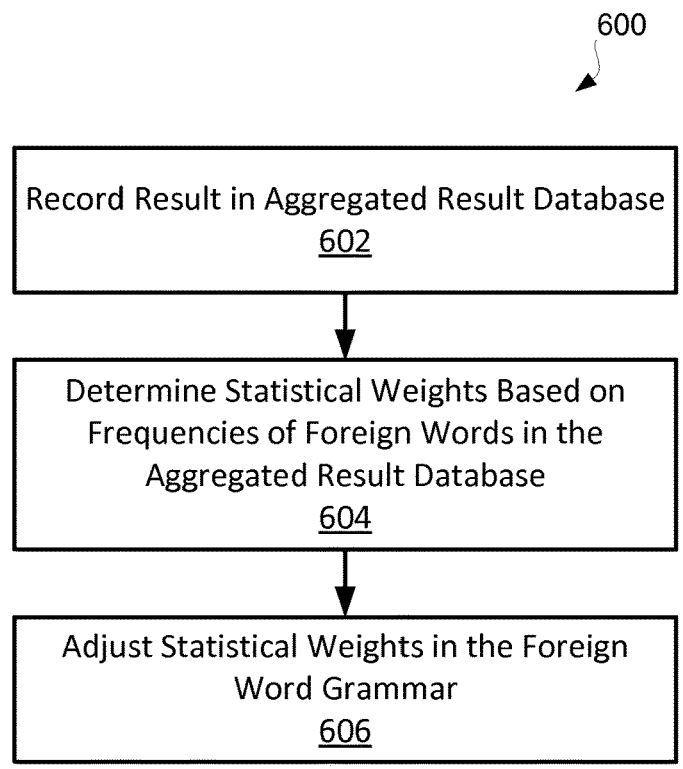
FIG. 6 depicts a method for adjusting the statistical weights in the foreign word grammar.

FIG. 6 depicts an exemplary method 600 for adjusting the statistical weights in the foreign word grammar 112. The method 600 is one example be a more detailed depiction of operation 516 from FIG. 5. At operation 602, the recognized foreign word is stored in the aggregated result database 118. At operation 604, statistical weights are determined based on the frequencies of the foreign words in the aggregated result database 118. For example, where a foreign word has been recognized more frequently, that foreign word will occur in the aggregated database more frequently. Higher statistical weights may be assigned to foreign words occurring more frequently in the foreign word database. Based on the statistical weights determined in operation 604, the statistical weights in the foreign word grammar 112 may be adjusted at operation 606. The adjustment may result from a comparison the statistical weights being utilized prior to the result being received at operation 602 and the statistical weights determined at operation 604. If the two statistical weights are different, the statistical weights in the foreign word grammar 112 are updated or adjusted.

Figure 7:
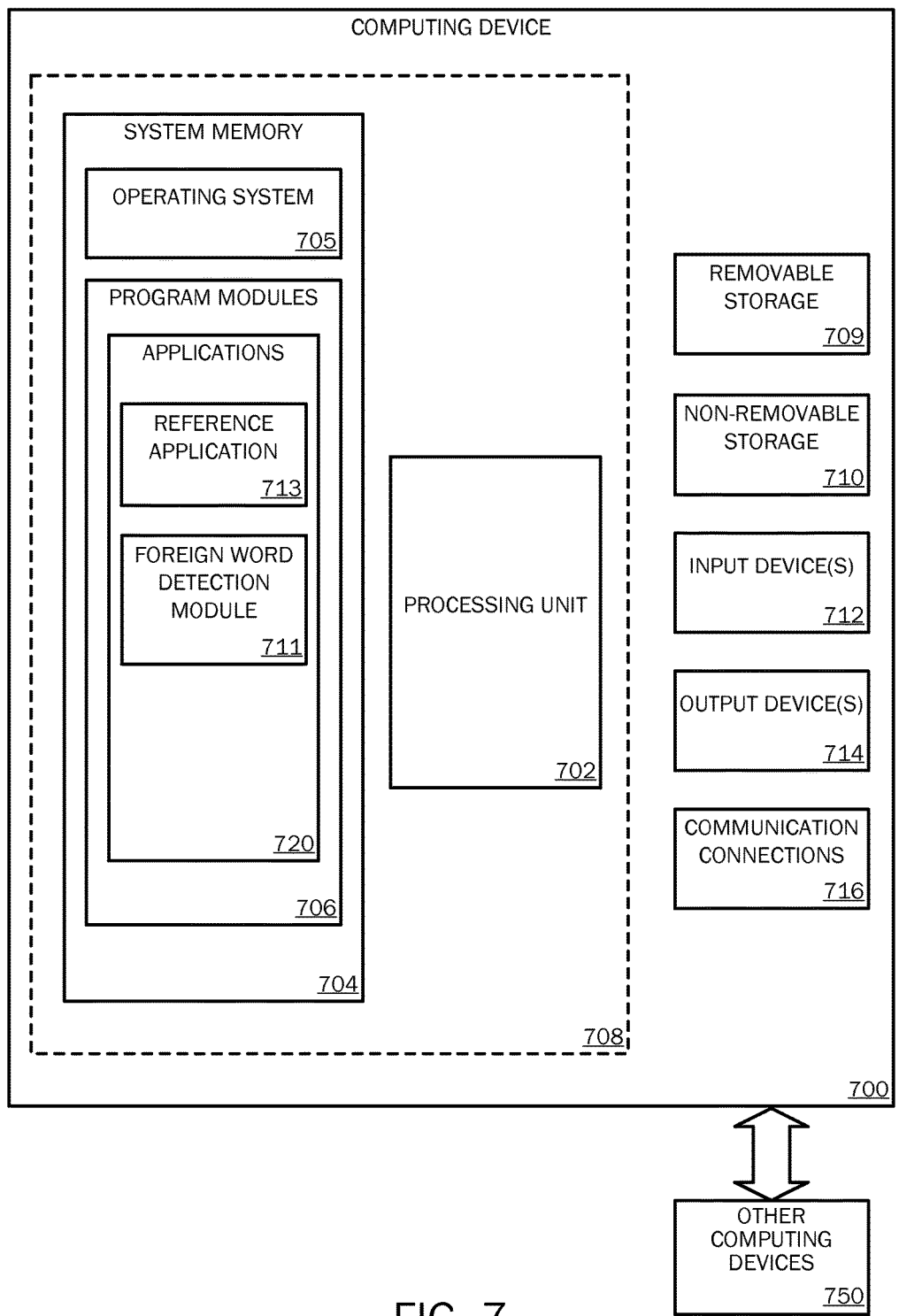
FIG. 7 is a block diagram illustrating example physical components of a computing device with which embodiments of the disclosure may be practiced.

FIG. 7 is a block diagram illustrating physical components (e.g., hardware) of a computing device 700 with which embodiments of the disclosure may be practiced. The computing device components described below may have computer executable instructions for a communication application 713, e.g., of a client and/or computer executable instructions for phoneme determination module 711, e.g., of a client, that can be executed to employ the methods disclosed herein. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running software applications 720 such as recognizing foreign words as discussed with regard to FIGS. 1-6 and, in particular, reference application 713 or foreign word detection module 711. Reference application 713 may include applications such as application 114. The foreign word detection module 711 may include many of the features depicted in FIG. 1. The operating system 705, for example, may be suitable for controlling the operation of the computing device 700. Furthermore, embodiments of the disclosure may be practiced in conjunction with a graphics library, audio library, speech database, speech synthesis applications, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., foreign word detection module 711 or reference application 713) may perform processes including, but not limited to, the embodiment, as described herein. Other program modules that may be used in accordance with embodiments of the present disclosure, and in particular to generate screen content and audio content, may include electronic mail and contacts applications, word processing applications, spreadsheet applications, database applications, slide presentation applications, drawing, messaging applications, mapping applications, speech-to-text applications, text-to-speech applications, and/or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. Such input devices may be utilized in conjunction with or in place of speech capture device 104. The output device(s) 714 such as a display, speakers, a printer, etc. may also be included. The aforementioned devices are examples and others may be used. The computing device 700 may include one or more communication connections 716 allowing communications with other computing devices 718. Examples of suitable communication connections 716 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
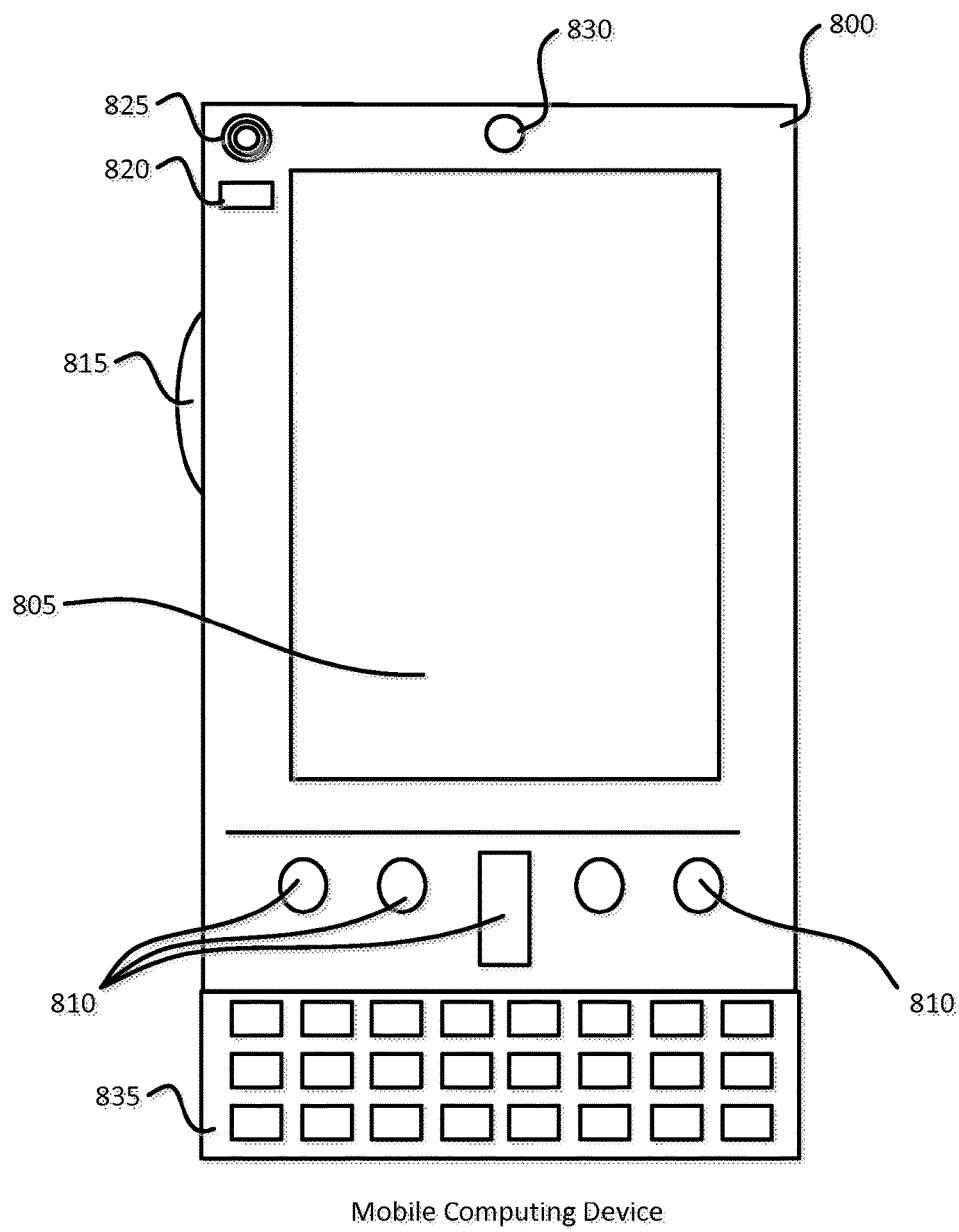
FIGS. 8A and 8B are simplified block diagrams of a mobile computing device with which embodiments of the present disclosure may be practiced.
Figure 8B:
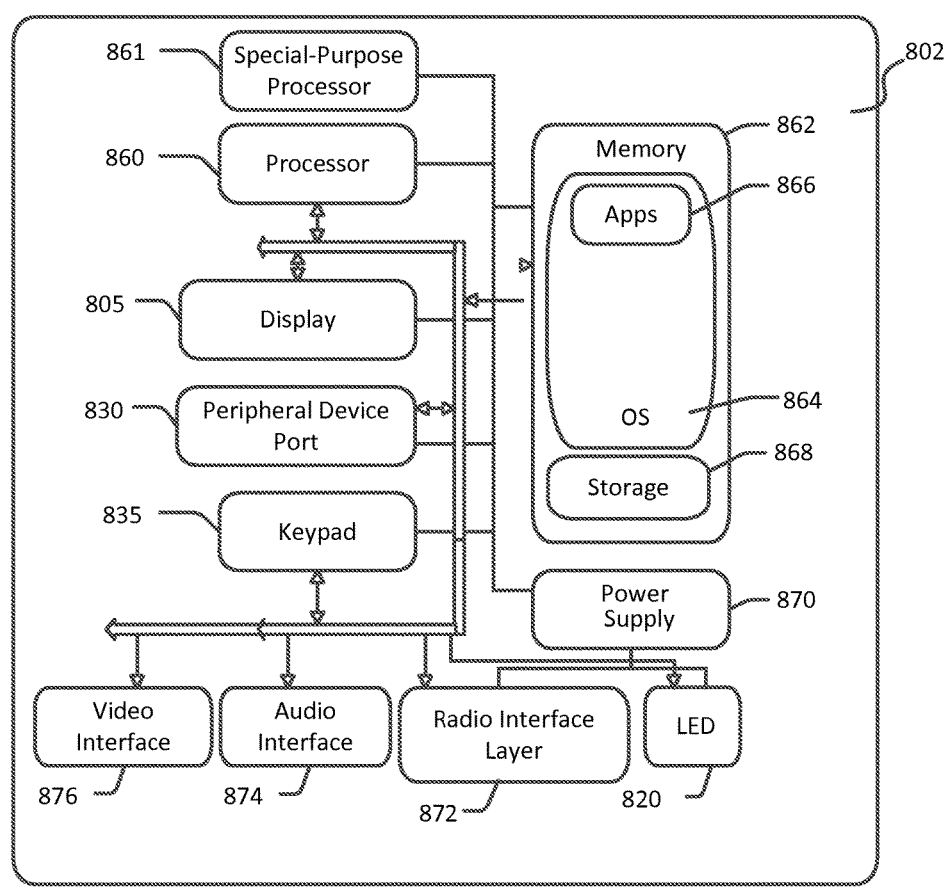

FIGS. 8A and 8B illustrate a mobile computing device 800, for example, a mobile telephone, a smart phone, wearable computer (such as a smart watch), a tablet computer, a laptop computer, and the like, with which embodiments of the disclosure may be practiced. In some embodiments, the client may be a mobile computing device. With reference to FIG. 8A, one embodiment of a mobile computing device 800 for implementing the embodiments is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative embodiments, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some embodiments, the mobile computing device 800 incorporates a vibration transducer for providing the user with tactile feedback. In yet another embodiment, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one embodiment of a mobile computing device. That is, the mobile computing device 800 can incorporate a system (e.g., an architecture) 802 to implement some embodiments. In one embodiment, the system 802 is implemented as a "smart phone" capable of running one or more applications (e.g., browser, e-mail, calendaring, contact managers, messaging clients, games, text-to-speech applications, and media clients/players). In some embodiments, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, text-to-speech applications, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including the instructions to determine and assign phonetic properties as described herein (e.g., and/or optionally phoneme determination module 711).

The system 802 has a power supply 870, which may be implemented as one or more batteries. The power supply 870 might further include an external power source, such as an AC adapter or a powered docking cradle that supplements or recharges the batteries.

The system 802 may also include a radio 872 that performs the function of transmitting and receiving radio frequency communications. The radio 872 facilitates wireless connectivity between the system 802 and the "outside world," via a communications carrier or service provider. Transmissions to and from the radio 872 are conducted under control of the operating system 864. In other words, communications received by the radio 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation or capture speech. In accordance with embodiments of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio 872 or via a distributed computing network. Similarly, such data/information may be readily transferred between computing devices for storage and use according to well-known data/information transfer and storage means, including electronic mail and collaborative data/information sharing systems.

Figure 9:
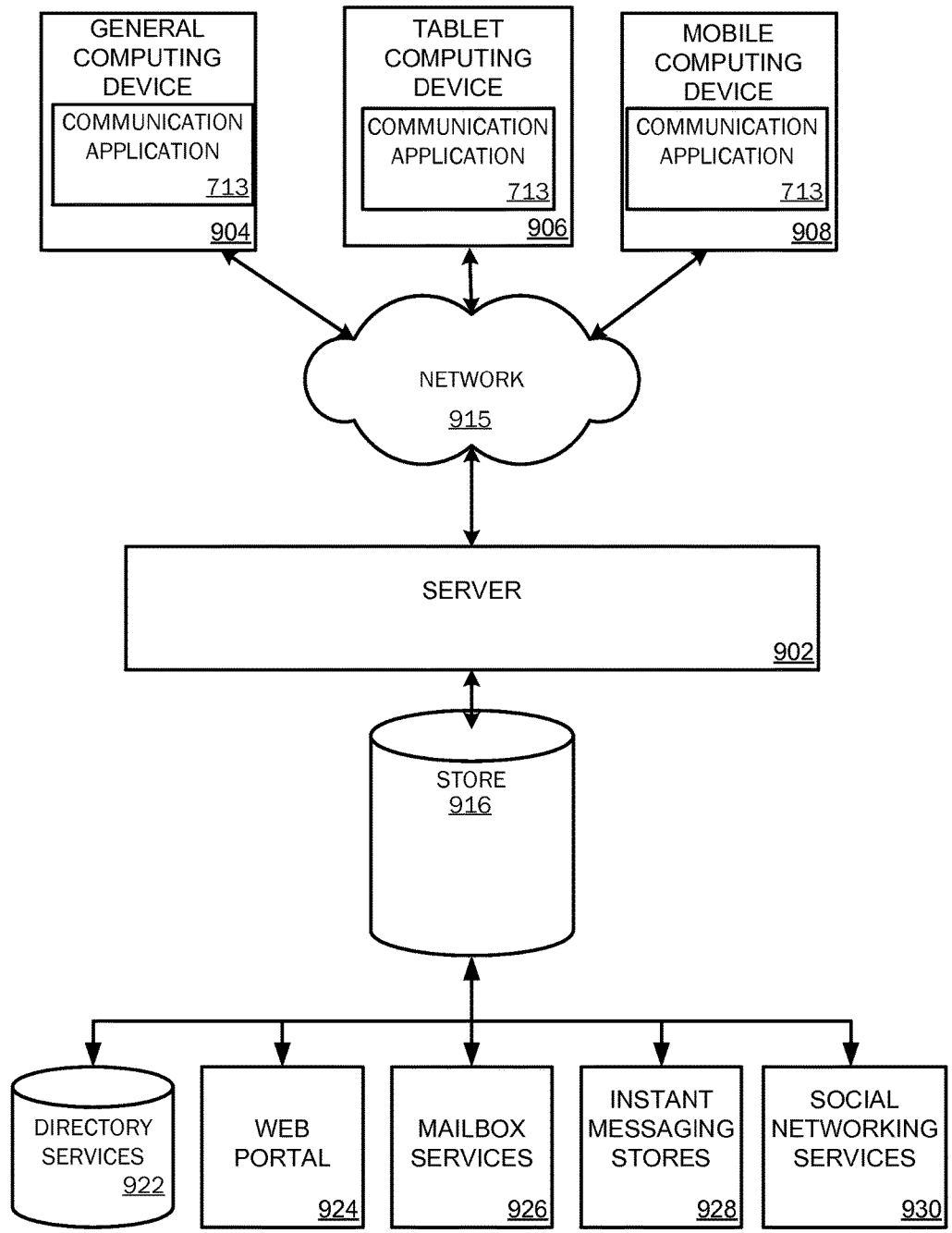
FIG. 9 is a simplified block diagram of a distributed computing system in which embodiments of the present disclosure may be practiced.

FIG. 9 illustrates one embodiment of the architecture of a system for processing data received at a computing system from a remote source, such as a computing device 904, tablet 906, or mobile device 908, as described above. Content displayed at server device 902 may be stored in different communication channels or other storage types. For example, various documents may be stored using a directory service 922, a web portal 924, a mailbox service 926, an instant messaging store 928, or a social networking site 930. The communication application 713 may be employed by a client who communicates with server 902. The server 902 may provide data to and from a client computing device such as a personal computer 904, a tablet computing device 906 and/or a mobile computing device 908 (e.g., a smart phone) through a network 915. By way of example, the computer system described above with respect to FIGS. 1-4 may be embodied in a personal computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Figure 10:
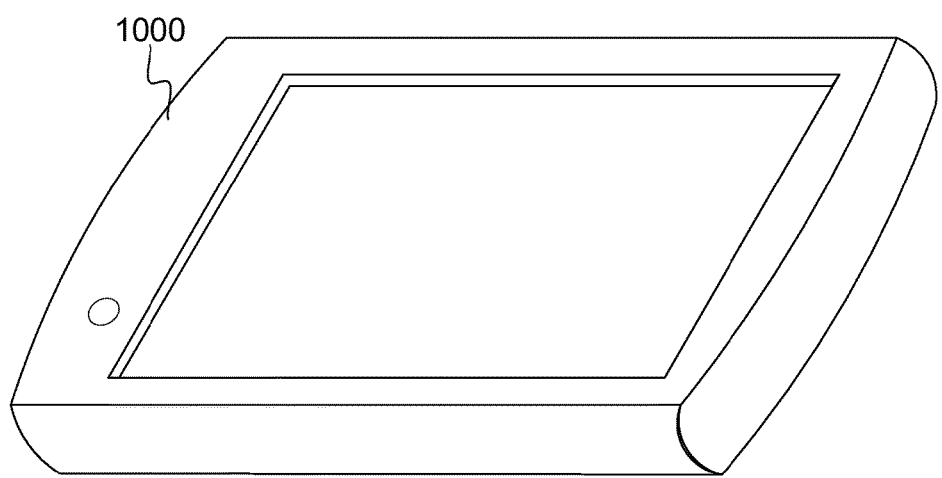
FIG. 10 illustrates a tablet computing device for executing one or more embodiments of the present disclosure.

FIG. 10 illustrates an exemplary tablet computing device 1000 that may execute one or more embodiments disclosed herein. In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

In addition, to protect the privacy of the user, any aggregation of potentially confidential data of or from a user or resulting from the input of a user may first be anonymized prior to being utilized in the systems and methods disclosed herein. Such anonymization may include the removal of some or all metadata or other data that may connect the results to be utilized to the individual user. The level of desired anonymization may be selected or customized by the user.

The description and illustration of one or more embodiments provided in this application are not intended to limit or restrict the scope of the disclosure as claimed in any way. The embodiments, examples, and details provided in this application are considered sufficient to convey possession and enable others to make and use the best mode of claimed disclosure. Further, the terms "exemplary" and "illustrative" are meant only to be indicative of examples, and not to designate one example necessarily being more useful or beneficial over any other example. The claimed disclosure should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed disclosure.

The invention claimed is:

1. A computer-implemented method for improved computerized speech recognition of speech uttered in at least two different languages, the method comprising:
  receiving speech input, wherein the speech input includes the foreign word;
  detecting, in the speech input, a sentence entry grammar structure from a set of predetermined sentence entry grammar structures, wherein the detected sentence entry grammar structure includes static text in a first language indicating that the foreign word in a second language is to be identified and a placeholder for the foreign word, wherein the foreign word is in the second language;
  based on detecting the sentence entry grammar structure, triggering the use of a foreign word grammar for recognition of the foreign word in the placeholder;
  utilizing the foreign word grammar storing a plurality of rules to recognize the foreign word, wherein the foreign word grammar includes a first rule in the form of a grammar structure for processing the spoken form of the foreign word and a second rule in the form of a grammar structure for processing the spelling form of the foreign word;
  generating a response based on the recognized foreign word;
  recording the recognized foreign word in an aggregated result database; and
  adjusting statistical weights in the foreign word grammar.

2. The method of claim 1, further comprising sending the recognized foreign word to an application, wherein the application is selected based on at least the detected sentence entry grammar structure.

3. The method of claim 2, further comprising receiving results from the application, wherein the results from the application include a definition for the foreign word in the first language.

4. The method of claim 1, wherein speech input of the foreign word is received as a spelling of the foreign word.

5. The method of claim 1, wherein the foreign word grammar includes a prefix tree, and utilizing the foreign word grammar further comprises utilizing the prefix tree to recognize the foreign word, wherein probabilities are incorporated into transition arcs of the prefix tree.

6. The method of claim 1, wherein the speech input is captured on a client device and received from the client device at a cloud-based server; and wherein the detecting the sentence entry grammar structure and the utilizing the foreign word grammar to recognize the foreign word are performed on the cloud-based server.

7. The method of claim 1, wherein the foreign word grammar constrains the results of the speech recognition to only those words included within the foreign word grammar.

8. The method of claim 1, wherein the foreign word grammar includes multiple words in the second language, wherein all the words in the foreign word grammar are legitimate words or slang terms in the second language.

9. A computer storage device, having computer-executable instructions that, when executed by at least one processor, perform a method for speech recognition of a foreign word, the method comprising:

capturing speech input, wherein the speech input includes a spelling of the foreign word;

receiving a result for the speech recognition of the foreign word, wherein the result of the speech recognition is based on:

a detection of a sentence entry grammar structure in the captured speech, wherein the sentence entry grammar structure is from a set of predetermined sentence entry grammar structures and includes static text in a first language indicating that the foreign word in a second language is to be identified and a placeholder for the foreign word, wherein the foreign word is in a second language; and based on the detection of the sentence entry grammar structure, a utilization of a foreign word grammar, storing a plurality of rules, to recognize the foreign word, wherein the foreign word grammar includes a first rule in the form of a grammar structure for the spoken form the foreign word and a second rule in the form of a grammar structure for the spelling of the foreign word, and the foreign word grammar constrains results of the recognition to words in the foreign word grammar, wherein the words in the foreign word grammar are only legitimate words or slang terms in the second language; and generating a response based on the recognized foreign word;

recording the recognized foreign word in an aggregated result database; and adjusting statistical weights in the foreign word grammar.

10. The computer storage device of claim 9, wherein the application is selected based on at least the detected sentence entry grammar structure.

11. The computer storage device of claim 10, wherein the action is retrieving a definition in the first language for the foreign word.

12. The computer storage device of claim 10, wherein the foreign word grammar includes a prefix tree, and utilizing the foreign word grammar further comprises utilizing the prefix tree to recognize the foreign word, wherein probabilities are incorporated into transition arcs of the prefix tree.

13. A system comprising:

at least one processor; and a memory including instructions that when executed by the at least one processor performs a set of actions comprising:

receiving speech input, wherein the speech input includes the foreign word;

detecting, in the speech input, a sentence entry grammar structure from a set of predetermined sentence entry grammar structures, wherein the detected sentence entry grammar structure includes static text in a first language indicating that the foreign word in a second language is to be identified and a placeholder for the foreign word, wherein the foreign word is in a second language;

based on detecting the sentence entry grammar structure, triggering the use of a foreign word grammar for recognition of the foreign word in the placeholder;

utilizing the foreign word grammar storing a plurality of rules to recognize the foreign word, wherein the foreign word grammar includes a first rule in the form of a grammar structure for the spoken form of the foreign word and a second rule in the form of a grammar structure for the spelling form of the foreign word, wherein the foreign word grammar includes a prefix tree, and utilizing the foreign word grammar further comprises utilizing the prefix tree to recognize the foreign word, wherein probabilities are incorporated into transition arcs of the prefix tree; and executing a function based on the detected sentence entry grammar structure.

14. The system of claim 13, wherein the application is selected based on at least the detected sentence entry grammar structure.

15. The system of claim 13, wherein the function includes retrieving a definition in the first language for the foreign word.

16. The system of claim 13, wherein the actions further comprise:

recording the recognized foreign word in an aggregated result database; and adjusting statistical weights in the foreign word grammar.

17. The system of claim 13, wherein the speech input is captured on a client device and received from the client device at a cloud-based server; and wherein the detecting the sentence entry grammar structure and the utilizing the foreign word grammar to recognize the foreign word are performed on the cloud-based server.

18. The system of claim 13, wherein speech input of the foreign word is received as a spelling of the foreign word.

* * * * *